G. CONSTANTINESCO.
ROCK DRILL AND LIKE MACHINE.
APPLICATION FILED MAR. 12, 1917.
1,334,284.
Patented Mar. 23, 1920.
3 SHEETS—SHEET 1.
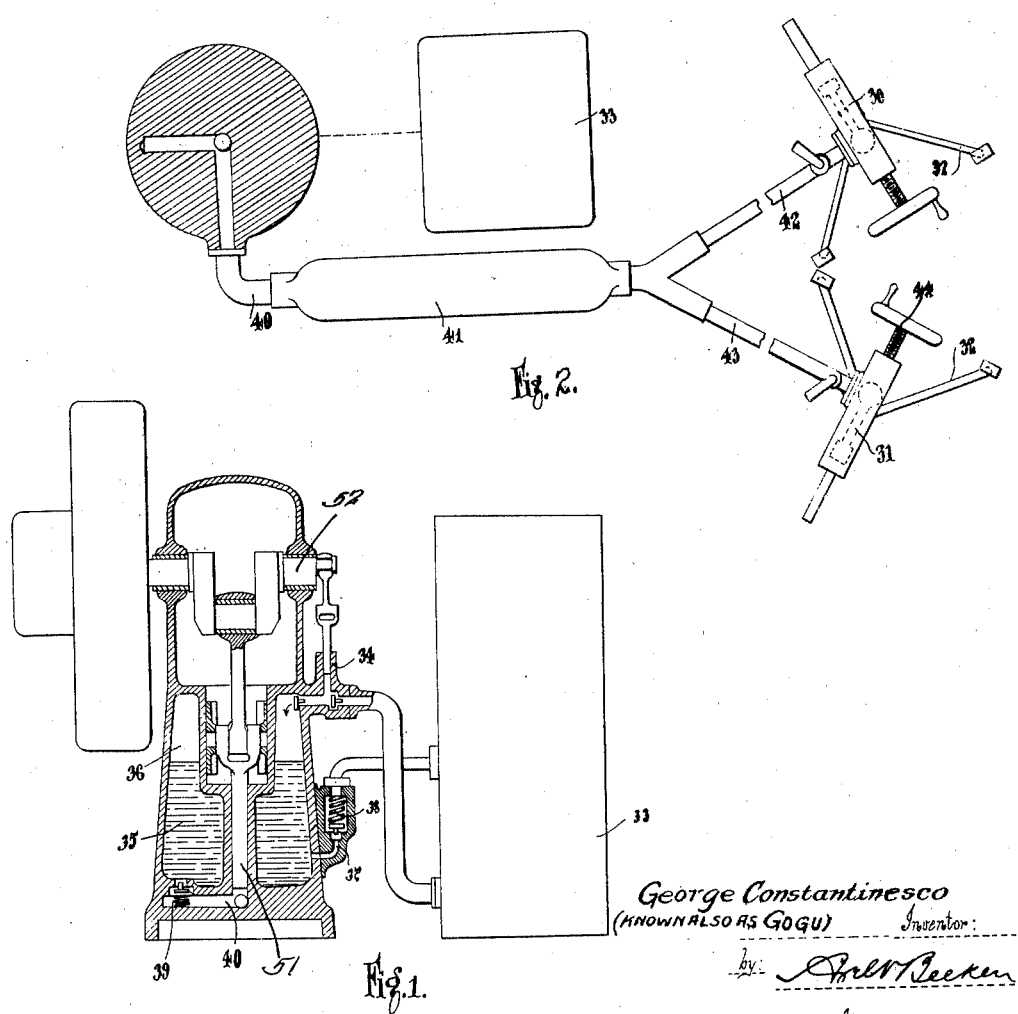
George Constantinesco
(KNOWN ALSO AS GOGU) Inventor

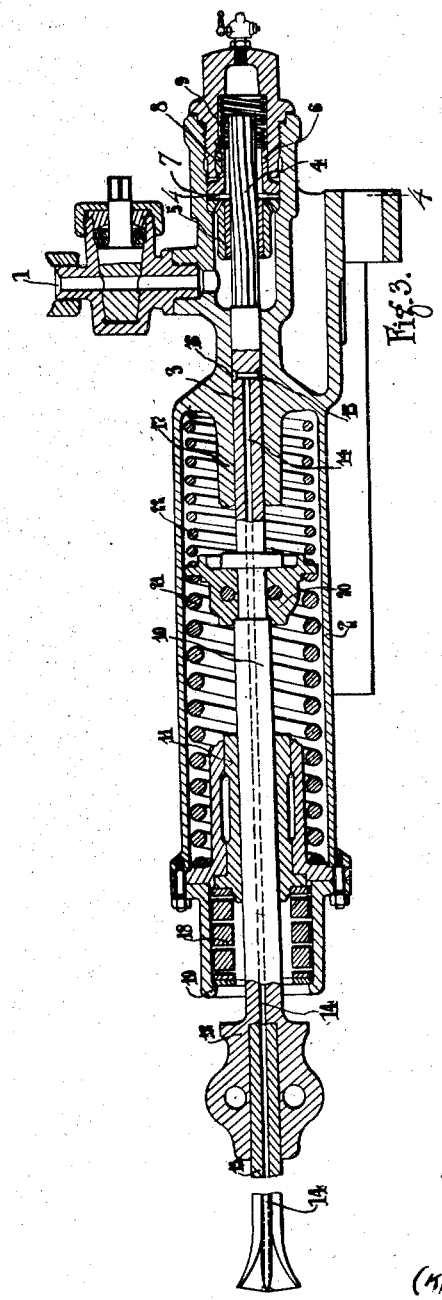

G. CONSTANTINESCO.
ROCK DRILL AND LIKE MACHINE.
APPLICATION FILED MAR. 12, 1917.

1,334,284.

Patented Mar. 23, 1920.
3 SHEETS—SHEET 3.

Inventor:
George Constantinesco
(KNOWN ALSO AS GOGU)

by

Attorney.

UNITED STATES PATENT OFFICE.

GEORGE CONSTANTINESCO, OF WEYBRIDGE, ENGLAND, ASSIGNOR OF ONE-HALF TO WALTER HADDON, OF LONDON, E. C., ENGLAND.

ROCK-DRILL AND LIKE MACHINE.

1,334,284.   Specification of Letters Patent.   Patented Mar. 23, 1920.

Original application filed April 27, 1915, Serial No. 24,230. Divided and this application filed March 12, 1917. Serial No. 154,249.

*To all whom it may concern:*

Be it known that I, GEORGE (known also as GOGU) CONSTANTINESCO, a subject of the King of Great Britain and Ireland, formerly a subject of the King of Roumania, residing at "Carmen Sylva," Beechwood avenue, Oatlands Park, Weybridge, in the county of Surrey, England, (formerly residing at The Haddon Engineering Works, Honeypot Lane, Alperton, in the county of Middlesex, England, and formerly of "Underwood," 8 Lichfield road, Kew Gardens, London, W., England,) have invented certain new and useful Improvements in Rock-Drills and like Machines, of which the following is a specification.

The present invention relates to the application of methods of energy transmission by wave motion through liquids to machines such as rock drills or other reciprocating instruments of the kind described in my application Serial No. 24230, filed April 27th, 1915, of which this application is a division.

The invention consists in a method of operating a rock drill or like reciprocating instrument at a distance from the generator of power by periodic changes of pressure and volume in a liquid column between the generator and the instrument.

Referring to the accompanying drawings:

Figures 1 and 2 show a generator arranged to drive two rock drills mounted on suitable stands.

Fig. 3 shows a combined condenser and rock drill, while

Figure 4:
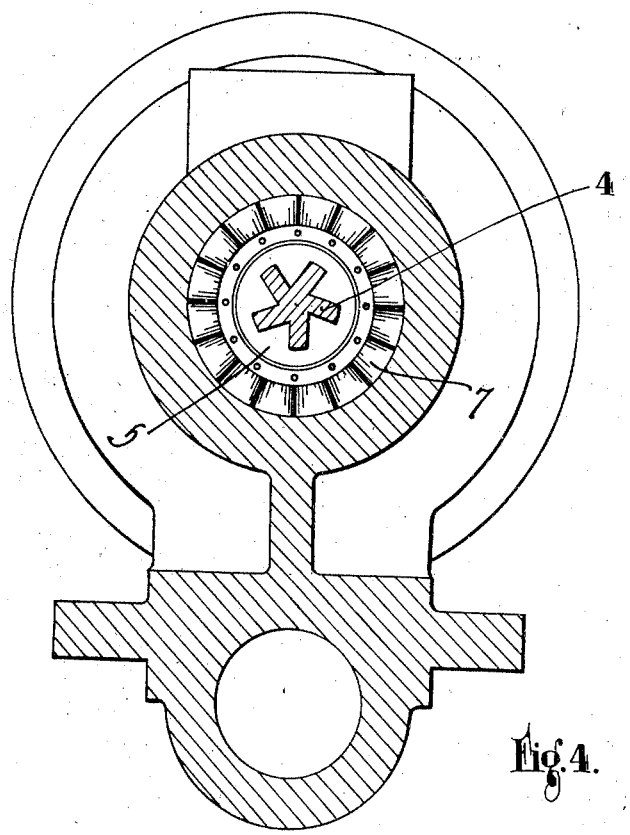
Fig. 4 is a section on the line 4—4, Fig. 3.

In the plant illustrated the pump consists of a piston 51 reciprocated by a crank shaft 52 at the speed of reciprocation equal to the period of reciprocation desired for the drills or other instruments. A very small valve 39 is provided leading from the chamber 35 to the cylinder of the pump and allowing a very small quantity of water to flow into the pump chamber at each reciprocation of the piston. This flow is extremely small in comparison with the quantity of liquid which is displaced by the pump plunger.

Liquid is pumped into the chamber 35 by a small auxiliary pump 34 from a store of liquid contained in the vessel 33. The level in the chamber 35 is kept constant by means of the passage 37 and non-return valve 38. Connected to the pump there is a pipe 40 leading to a large vessel 41 having walls thick enough to be substantially rigid under the pressures used which vary from say ten to one thousand pounds per square inch above atmosphere with a mean pressure of about five hundred pounds per square inch. From the vessel 41 pipes 42, 43, lead to the drills 30, 31. There is a continuous column of liquid between the piston 51 and the piston 10 of the drill shown in Fig. 3. The drill comprises a piston 3 on which the liquid column acts. The liquid is admitted at 1 and when the pump is in operation causes pulsations to take place in the cylinder 2. The working piston 3 is integral with the rifled extension 4, working in a ratchet device 5, 6. The member 5 carries a rifled bushing, and suitable teeth 7, engaging with similar teeth in the member 6. The member 6 is free to move longitudinally in the direction of the axis of the piston, but is prevented from revolving by longitudinal sliding keys 8. A spring 9 presses the part of the ratchet 6 against the part 5. When the rifled extension 4 moves longitudinally, it rotates the ratchet 5, but the form of the teeth 7 is such that in one direction they hold together, but not in the other. In this way on the down stroke of the piston the teeth slip, and the piston does not rotate; while on the up stroke of the piston they bind together, and the piston rotates. The piston rod is thus rotated slowly in one direction, in order to turn the cutting bit. The piston 3 is integral with the rod 10, sliding in the bushing 11. The chuck 12 at the end of the rod 10 holds the drill bit 13. The piston rod 10 and the drill bit are perforated in the center by a passage 14 ending in a cross passage 15, communicating with an annular chamber 16 around the piston 3. In the forward end of the drill body 17 a stiff spring 18 is provided, held between the flange 19 and the bushing 11. The bushing 11 is free to slide longitudinally against the spring 18. The piston rod 10 carries a flange 20, supported by two springs 21, 22, forming a condenser with the piston working the drill, the spring 21 being stronger than the spring 22, in order to provide for the return stroke of the piston when working.

The operation of the instrument is as follows:

The pulsations of the liquid entering by the passage 1 transmit motion to the mass formed by the piston rod and drill bits, this inertia being conveniently balanced by the condenser formed by the springs 21, 22, and the piston 3. The cutting of the rock is effected by the percussive movement applied to the bit 13, and the rotation is effected by the ratchet 5, 6, as above described. A leakage occurs between the piston 3 and the cylinder walls 17, and through the annular space 16 and the passage 14 to the end of the drill bit. If water is used in the system a continuous flow of water will thus be produced at the drill point. This play should not be excessive, so as to interfere with the working of the instrument.

The distance between the pump and the drills may be any convenient distance, for example, 500 feet. The drill illustrated, or other reciprocating percussive tool, is thus operated at the end of a long liquid column to which a series of periodic variations of volume and pressure are transmitted by means of a pump as described in the British Letters Patent No. 9029 of 1913 and 12438 of 1914, the power being transmitted by a true wave motion which is made possible by reason of the elasticity of the liquid in the pipe.

In the particular case illustrated in addition to the waves of pressure and volume there is also a slight flow of liquid continuously from the pump to the drills sufficient to provide a spray at the drill or drills for the purpose of washing out the hole made in the rock and for cooling the tool. This flow, however, has nothing to do with the reciprocation of the moving part of the drill.

Having now described my invention, what I claim as new and desire to secure by Letters Patent is:—

1. A method of operating a reciprocating instrument at a distance which consists in generating a series of periodic variations of pressure and volume in a single liquid column between the generator and the instrument, allowing these periodic changes of pressure and volume to travel along the liquid column and act on a piston in the reciprocating instrument, the time period of the periodic variations produced by the generator being equal to the natural time period of reciprocation of the driven instrument, as set forth.

2. A valveless rock drill comprising in combination a piston, springs acting in opposite directions on said piston, and means including a valveless pump and a transmission pipe between said pump and said drill for applying alternating liquid currents to said piston, said springs and the mass of said piston being such that the natural period of vibration of the reciprocating part of said rock drill is equal to the time period of the alternating liquid currents impressed on the transmission line.

In testimony whereof I have signed my name to this specification.

GOGU CONSTANTINESCO.